United States Patent
Haberkorn

[15] 3,645,476
[45] Feb. 29, 1972

[54] LIFT ENGINE ARRANGEMENT FOR V/STOL AIRCRAFT

[72] Inventor: Erich J. Haberkorn, Friedrich-Frobel-Strasse 40, Riemerling, Germany

[22] Filed: Nov. 26, 1969

[21] Appl. No.: 881,944

[52] U.S. Cl................................244/12 B, 244/55
[51] Int. Cl.....................................B64c 29/00
[58] Field of Search..............................244/12, 55

[56] References Cited

UNITED STATES PATENTS 3,383,074   5/1968   Coplin..........................244/55

*Primary Examiner*—Milton Buchler
*Assistant Examiner*—Steven W. Weinrieb
*Attorney*—Kemon, Palmer & Estabrook

[57] ABSTRACT

A V/Stol aircraft has jet engines which are mounted vertically in the aircraft and their discharge is conducted directly to a lift-fan associated with each engine. In order to change the position of the fans from an inoperative one within the aircraft to an operative one extending outwardly of the aircraft, they are mounted for rotation about the axis of their respective engine, and the engines may be mounted either rigidly or for rotation about their own axes together with their associated fan.

1 Claims, 4 Drawing Figures

Patented Feb. 29, 1972

INVENTOR.
Erich J. Haberkorn
BY
Kenyon, Palmer & Estabrook
Attorneys

EM 247

LIFT ENGINE ARRANGEMENT FOR V/STOL AIRCRAFT

This invention relates to a lift engine arrangement for V/STOL aircraft, having several jet engines installed vertically in the fuselage which serve as gas generators and several lift-fans provided with tip-blade turbines which swing horizontally out of the fuselage.

By mounting a lift-fan behind a jet engine, engine thrust can, in general, be substantially increased with simultaneous reduction in the jet load per unit area and thus jet efficiency for lifting purposes can be improved.

A device of the kind mentioned at the outset is already known, having in the forward section of the fuselage a group of four jet engines. The hot gases produced by the engines are conducted through a system of ducts to four lift-fans located symmetrically about the center of gravity.

Due to the separate arrangement of the gas producers and lift-fans, the gas ducts become bulky and heavy and cause considerable pressure losses due to friction. In addition, military aircraft which are exposed to enemy fire have a high risk of suffering damage in such a large ducting system. A further disadvantage is that the space available in the fuselage for installation of the lift-fans is very small, so that the moments produced by the extended lift-fans must be concentrated upon a small base, which of necessity results in heavy designs.

It is the object of the present invention to provide a device of the type mentioned at the outset which presents compact construction, minimum flow losses and minimum susceptibility to damage.

The invention achieves this by providing each jet engine with one lift-fan to form an integrated lifting unit, the jet engine nozzle discharging directly into the fan housing, more or less perpendicularly to the lift-fan plane.

In this manner long gas paths and directional changes are avoided, so that no, or only very slight, flow losses occur.

Another feature of the invention provides that each jet engine be firmly attached to the associated lift-fan and that the complete lift unit be capable of tilting about an axis which coincides with that of the engine. In this way, no further movable connections exist between the jet engine and the associated lift-fan, so that no further sealing problems can arise.

The invention furthermore provides that each lift unit be supported by the bearing in the fuselage supporting the jet engine. This permits the entire length of the jet engine to be used as a base for absorbing the moment produced by the lift engine.

Another feature of the invention provides that each lift unit be capable of tilting by means of an actuator acting upon the jet engine. In this way, the lift-fan is essentially free of parts attached to the exterior, so that the envelope in the fuselage required for the lift-fan can be kept as small as possible.

In another illustrative embodiment, each lift-fan is supported at the exhaust nozzle of the associated jet engine in such a way as to be capable of tilting about the engine axis. This type of construction is above all provided when, for example, the engines themselves must of necessity be rigidly installed.

One embodiment of the invention provides that all lift units be joined together in the known ways by a system of gas ducts.

Other additional features and advantages of this invention will become apparent through reference to the following description and accompanying drawings which show several embodiments of this invention:

Figure 1:
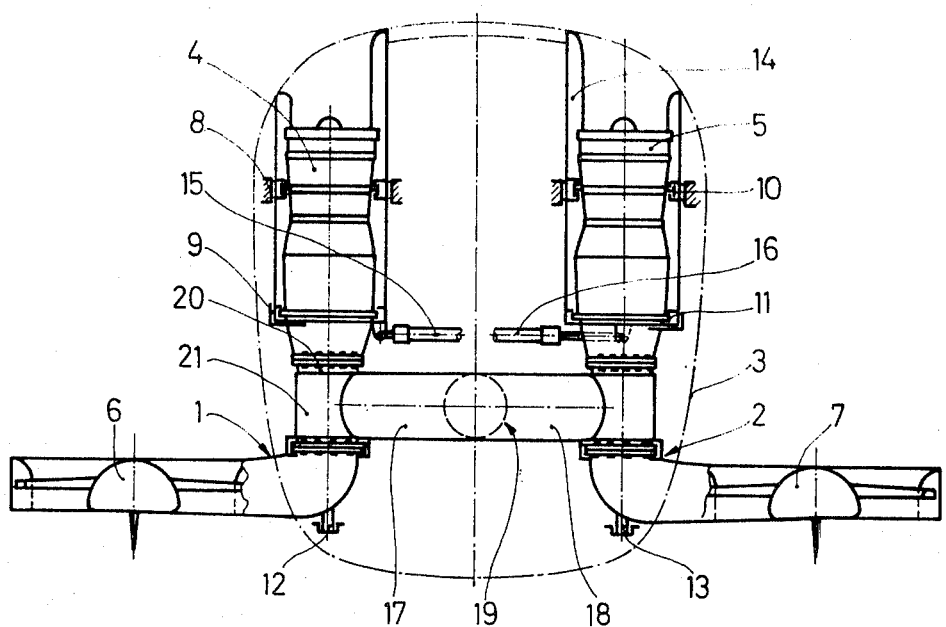
FIG. 1 is a cross section through an aircraft fuselage in the vicinity of two lift units installed side by side in the fuselage, the jet engines and the lift-fans being rigidly attached to each other.
Figure 2:
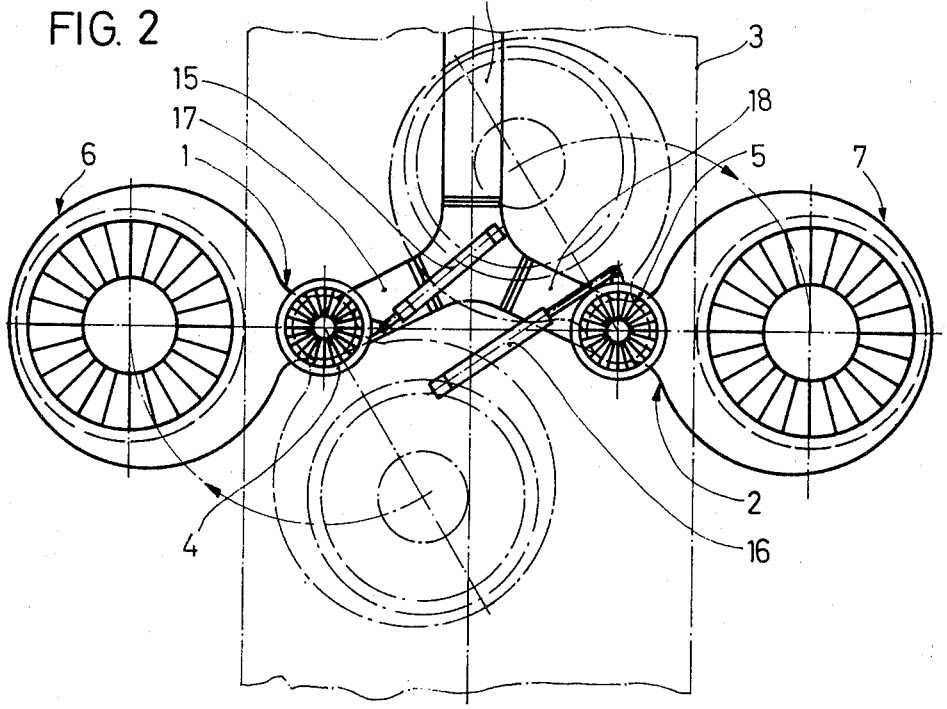
FIG. 2 is a plan view of an aircraft fuselage per FIG. 1.

The illustrative embodiments shown in FIGS. 1 and 2 have two lift units 1, a jet engine 4 or 5 and a lift-fan 6 or 7. The lift-fans are rigidly affixed to the associated jet engines and are tilted together with the latter. In order to accomplish this, engines 4 or 5 are each supported in the structure 14 of fuselage 3 by bearing pairs 8, 9 or 10, 11 and by supports 12 or 13. Bearing pairs 8, 9 and 10, 11 are essentially for the purpose of absorbing the moments created by the reaction forces and/or weight of the lift-fans, while supports 12 or 13 absorb the longitudinal forces of the particular lift-unit.

Hydraulic cylinders 15 or 16 are provided to tilt the lift-fans and act directly upon engines 4 or 5 and are supported in the fuselage structure.

Also shown is a system of gas balancing ducts 17, 18, 19 which in case of failure of one engine is to produce a uniform supply to all lift-fans. As is indicated in FIGS. 1 and 2, duct 19 leads to one or more additional lift units not described more closely. During normal operation, i.e., when all engines present are producing equal thrust, no flow takes place in the connecting ducts 17, 18, 19 as there is no pressure gradient from one end to the other.

The gases escaping from the engines thus flow directly into the associated lift-fan so that flow losses are largely prevented. For example, the connection of duct 17 to jet engine 4 is designed so that an intermediate part 20 joining engine 4 and lift-fan 6 which is provided with gas openings is surrounded by connecting part 21 which is itself attached to connecting duct 17 in a sleeve fashion. In this way a fixed connection is created between jet engine 4 and lift-fan 6 and the seals between intermediate part 20 and connecting part 21 are subject only to gas pressure and are not acted upon by any reaction forces from the lift-fan. Connections of this kind are prior art and need not be further described.

Figure 3:
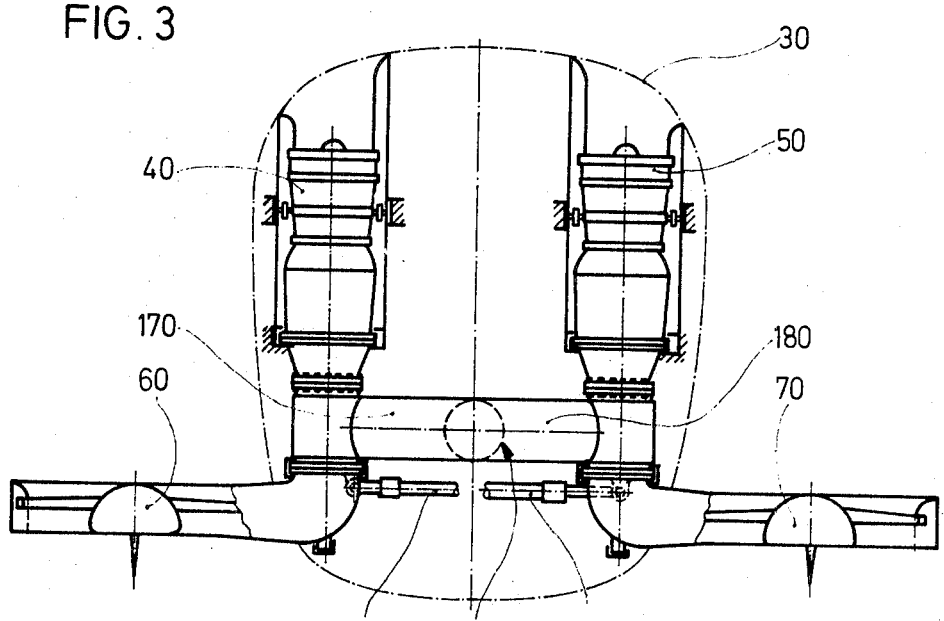
FIG. 3 is a cross section per FIG. 1, the lift-fans being however capable of being tilted with respect to the rigidly installed jet engines.
Figure 4:
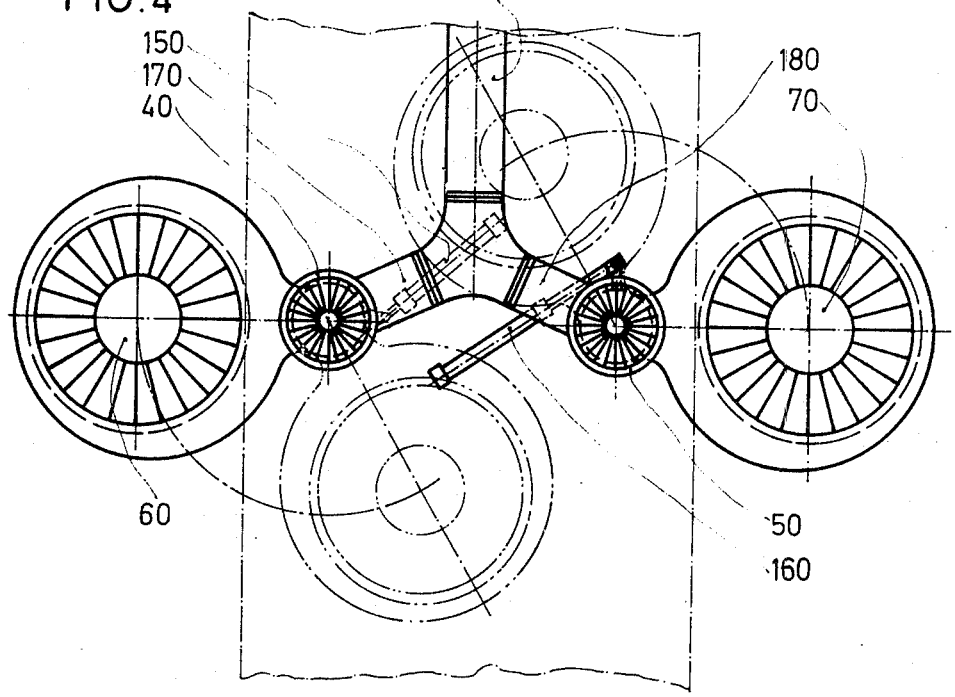
FIG. 4 is a plan view of an aircraft fuselage per FIG. 3.

FIGS. 3 and 4 show another illustrative embodiment, the construction of which essentially corresponds to that shown in FIGS. 1 and 2. However, engines 40, 50 are rigidly installed in fuselage 30, while lift-fans 60, 70 are attached to the nozzles of the jet in such a way as to be capable of tilting. Hydraulic cylinders 150, 160 provide the tilt drive for lift-fans 60, 70. These cylinders are supported by the aircraft structure and act directly upon the lift-fan housings.

As is the case with the first illustrative embodiment, connecting tubes 170, 180, 190 join all lift units to each other so that in case of failure of one or more engines symmetrical, although reduced thrust is available.

I claim:

1. In a V/Stol aircraft, means for producing thrust in a direction which is vertical with respect to the normal horizontal position or flight of the aircraft comprising:
    a. at least a pair of jet engines mounted on the aircraft with their axes of rotation perpendicular to the normal horizontal position or flight of the aircraft;
    b. at least a pair of lift fans and housings therefor mounted on the aircraft, each of said fans having its axes of rotation parallel to but spaced from the axis of rotation of its respective engine;
    c. first duct means rigidly interconnecting each of said engines with its respective fan to communicate the exhaust of said engines directly into the housings of said fans, said fans and housings being mounted for rotation about the axis of rotation of said engines, whereby said fans may be rotated between operative positions extending outwardly of the aircraft and inoperative positions in which they are received within the aircraft; and
    d. second duct means interconnecting the discharge of said engines in order to balance the flow of gases to said fans.

* * * * *

UNITED STATES PATENT OFFICE
CERTIFICATE OF CORRECTION

Patent No. 3,645,476            Dated February 29, 1972

Inventor(s) Erich J. Haberkorn

It is certified that error appears in the above-identified patent and that said Letters Patent are hereby corrected as shown below:

- Column 2 - line 5:

two lift units 1, a jet engine 4 or 5 and a lift-fan 6 or 7. The liftreplace with:

two lift units 1, 2 installed side by side in fuselage 3. Each lift unit 1 or 2 consists of a jet engine 4 or 5 and a lift-fan 6 or 7. The lift- Signed and sealed this 4th day of July 1972.

(SEAL)
Attest:

EDWARD M. FLETCHER, JR.
Attesting Officer

ROBERT GOTTSCHALK
Commissioner of Patents